No. 841,739. PATENTED JAN. 22, 1907.
B. E. TRITT.
POWER TRANSMITTING AND SPEED GOVERNING DEVICE.
APPLICATION FILED JULY 2, 1904.
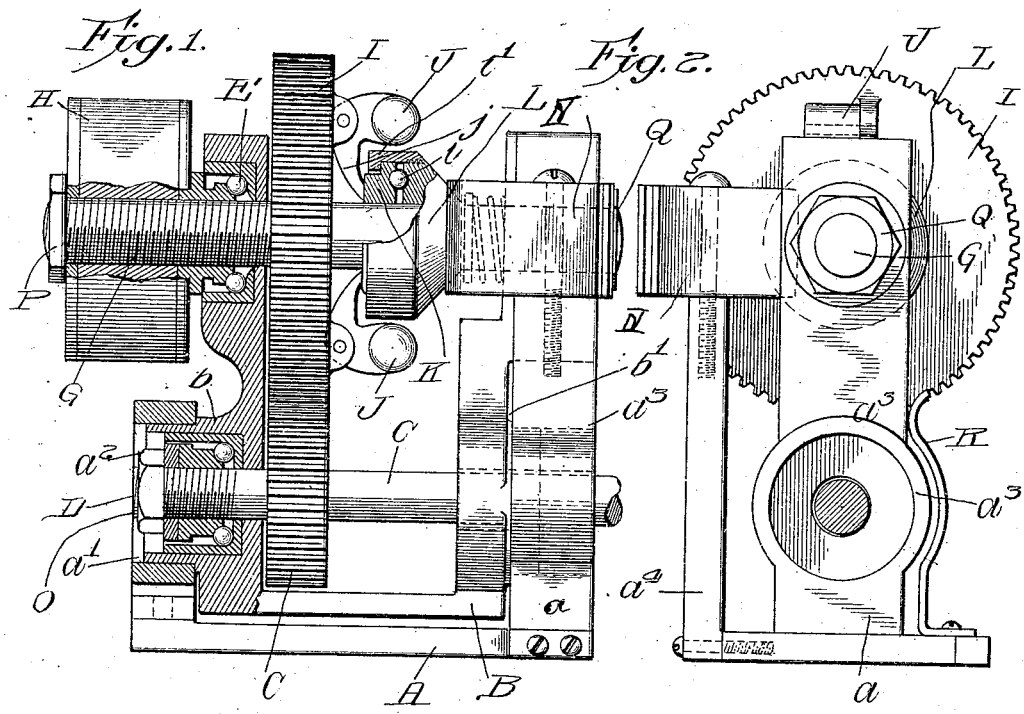
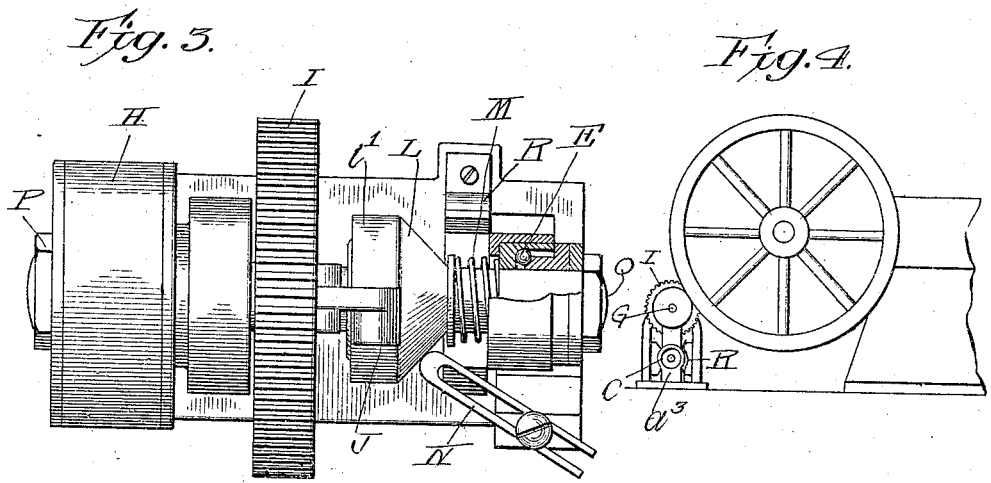
Witnesses:
G. V. Domarus.
Robert H. Weir.
Inventor:
Burleigh E. Tritt
By Bulkley & Durand
Attorneys.

UNITED STATES PATENT OFFICE.

BURLEIGH E. TRITT, OF SOUTH BEND, INDIANA.

POWER-TRANSMITTING AND SPEED-GOVERNING DEVICE.

No. 841,739.　　　Specification of Letters Patent.　　　Patented Jan. 22, 1907.

Application filed July 2, 1904. Serial No. 215,195.

*To all whom it may concern:*

Be it known that I, BURLEIGH E. TRITT, a citizen of the United States of America, and a resident of South Bend, Indiana, have invented a certain new and useful Improvement in Power-Transmitting and Speed-Governing Devices, of which the following is a specification.

My invention contemplates an improved form of speed-governing mechanism adapted for use in various connections, but adapted more particularly for use as a self-regulating power-transmitting connection between a suitable motor and a driven machine, and especially for use as a self-regulating power-transmitting connection between an internal-combustion engine and a dynamo or other generator—as, for example, the magneto or small generator operated by the engine and employed as means for furnishing the current necessary for producing ignition of the gas or vapor.

Generally stated, the object of my invention is the provision of a simple and highly-efficient governor or self-regulating power-transmitting connection of the aforestated character.

Certain special objects are to provide an improved construction and arrangement of parts, whereby the governing or self-regulating action of the power-transmitting connection may take place without the necessity of shifting either the motor or dynamo or other driving or driven machine; to provide an improved construction and arrangement whereby the transmission of power, although of a frictional character, may be of such nature as to insure a positive and quick starting of the dynamo or generator—that is to say, whereby such current-generator will start instantly and practically at the proper speed as soon as the fly-wheel of the engine starts, thereby insuring adequate current for sparking during the starting of the engine; to provide an improved construction and arrangement, particularly with respect to the bearings and other movable parts, whereby the transmission of power may be accomplished with practically a minimum of friction and without imposing injurious strains upon the device as a whole, and to provide certain details and features of improvement tending to increase the general efficiency and serviceability of a governor or self-regulating power-transmitting connection of this particular character.

In the accompanying drawings, Figure 1 is a front elevation of the speed-governing device involving the principles of my invention, certain parts being broken away and shown in section in order to more clearly illustrate the construction. Fig. 2 is a view of the right-hand end of the device shown in Fig. 1. Fig. 3 is a plan of the device shown in Fig. 1, certain portions being shown in section in order to more clearly illustrate the construction of one of the bearings. Fig. 4 is a diagram illustrating the application of my invention as a power-transmitting connection between an internal-combustion engine and a magneto or other suitable electric-current generator.

As thus illustrated, my improved speed-governing device comprises a bracket or body A, provided at the right-hand side with an upright portion $a$. At the left an upright portion $a'$, formed in a separate piece, is secured in a suitable manner to the said bracket or body. It will be observed that both of these upright portions are formed with annular openings $a^2$ and $a^3$, these openings being axially alined and adjusted to receive the hub portions of the swinging or oscillating U-frame B. These hub portions $b\ b'$ of the said U-frame are, as will be seen, adapted to serve as trunnions, and when thus mounted in the bearings provided by the upright portions $a$ and $a'$ permit the frame to swing about a horizontal axis. Preferably and in case the device is to be employed as a means for transmitting power from an internal-combustion engine to a magneto or generator—such, for example, as the small generator usually employed for producing the sparking—the armature-shaft C is supported at its driven end only, as shown in Fig. 1. This is accomplished, it will be seen, by providing the left-hand side of the U-frame with a ball-bearing D and by providing openings in the right-hand side of the U-frame in the upright $a$ large enough to permit the armature-shaft to pass therethrough without touching. With this arrangement it will be observed that the bearing for the armature-shaft is close to the pinion $c$, which latter is mounted upon said shaft. The upper end portions of the U-frame are preferably provided with bearings—such, for example, as the ball-bearings E and F—and in these two bearings thus axially alined with each other a spindle G is supported for rotation, but in such manner as to be incapable of endwise movement.

Upon the left-hand end of this spindle a pulley H, of rawhide, rubber, or any other suitable friction material, is mounted or otherwise secured to the spindle at a point immediately outside of the U-frame. Immediately inside of the left-hand upright portion of the U-frame and at a point where it properly engages the pinion $c$ a gear-wheel I is secured to the spindle G. The said gear-wheel is practically provided with a pair of governor-balls J, each provided with a finger $j$. These fingers point inwardly and are adapted to engage the collar K, which latter is loose on the spindle and may or may not rotate therewith; but at any rate the said collar must be capable of endwise or longitudinally sliding movement thereon. A cone L is also mounted upon the said spindle and arranged with its tapering surface facing toward the right, and between this cone and the collar K a number of anti-friction-balls $l$ are arranged in such manner as to permit the fingers to rotate the collar K without rotating the cone, thereby producing but little friction. The said cone and collar are preferably held together by a cap $l'$, provided with a shoulder engaging the collar and with a threaded portion engaging the screw-threaded portion of the cone. As will be observed, the collar thus mounted on the spindle is held against the fingers of the governor-balls by means of a coil-spring M, interposed between the cone and the upper right-hand portion of the U-frame, and with this provision the governor-balls are held in their normal positions. Normally the face or tapering surface of the cone L engages the rounded or properly-formed end portion of the cam-plate N, which latter is adjustably secured to the upright $a^4$. As a means for preventing displacement of the shaft and spindle it will be seen that a nut O is applied to the end of the former and that nuts P and Q are applied to the ends of the latter.

By making $a^4$ independent of $a$ the spindle G, carrying the gear and pulley, can be turned over to the right or left, Fig. 2, so that it will assume the same plane as or a lower plane than the trunnion, thereby permitting the machine to be applied to the top or bottom of a fly-wheel, as well as to the sides. Of course the spring R and the upright $a^4$ would have to be adjusted accordingly. By inverting the device it can be used in a hanging position.

Thus constructed it is obvious that my improved governor or self-regulating power-transmitting connection is adapted to transmit power from various sources to various kinds of machinery. It is particularly adapted, as previously stated, for use in transmitting power from an internal-combustion engine to a dynamo or to the small generator employed for producing the current necessary for causing the proper ignition of the gas or vapor in the engine. For example and if the device is to be employed as a means for connecting an internal-combustion engine with the sparking apparatus, the device as a whole is then mounted in such position as to bring the pulley H into contact with the fly-wheel of the engine, as shown diagrammatically in Fig. 4. As illustrated, it will be understood that the said fly-wheel is arranged to engage the front of the pulley H—that is to say, is arranged to engage said pulley at the front of the governing device as a whole. It should be borne in mind, however, that the machine can be applied to any part of the rim of a fly-wheel. The pulley can be made larger than the gear and the ratio between gear and pinion increased or decreased, as may be found desirable. As a matter of fact, the governing-balls can be applied to any rotary part and be made to perform the same function. When the speed of the engine becomes so great as to cause the armature of the generator to speed up or run faster than is desirable, the undue increase in speed serves to instantly cause the governor-balls to separate or fly apart and to thereby push the cone L along the spindle on which it is mounted. A very slight action or movement of this character is, it will be seen, sufficient to cause the cone and the cam-plate N to coöperate in shifting the spindle G laterally and in such direction as to carry the pulley H more or less out of contact with the fly-wheel of the engine. In other words, the governor-balls when subjected to centrifugal force cause the cone to act as a wedge and to thereby swing the U-frame backward at its upper end to an extent, as stated, to bring the pulley H more or less out of contact with the surface of the engine fly-wheel. In this way the device is self-regulating, so to speak, and automatically disconnects the motive power as soon as the speed rises beyond a certain point, and consequently the device has the double function of transmitting power and preserving the proper or desired speed on the part of the electric generator. Furthermore, it will be seen that the frictional surfaces upon which the transmission of power is dependent are automatically separated when the speed rises above a certain point without the necessity of moving the generator or the motor, and consequently the desired governing or self-regulating feature is obtained with respect to an electric generator which may be rigidly and firmly mounted upon any suitable support. Again, with the provision of bodily-swinging gearing or equivalent devices arranged as power-transmitting connection between the fly-wheel and armature-shaft it is evident that the pulley which engages the fly-wheel may be of substantial diameter—that is to say, of such diameter as to insure the proper speed on the part of the generator without being so small in diameter as to make it impossible for the engine to start the generator quickly and without slipping. In other words, with my improved arrangement the pulley which engages the fly-wheel of the engine may be of sufficient diameter to permit the engine to start the generator quickly and at the proper speed, thereby insuring sufficient current during the initial operation or starting of the engine to produce proper ignition of the gases or vapors in the engine. Also with the provision of the swinging frame carrying bearings at each end of the spindle and having trunnions mounted in suitable bearings the application of power to one end of the spindle does not tend to produce injurious straining of the different parts.

It will be readily understood that any suitable device or arrangement can be employed for holding the U-frame in its normal position and for keeping the pulley H in contact with the fly-wheel of the engine. For example, a spring R can be secured to the bracket or body A and arranged in position to have its upper end engage the back of said U-frame B. In this way the pulley H is yieldingly presented to the periphery of the fly-wheel and is yieldingly maintained in contact therewith. The said spring must of course have its tension so adjusted as not to interfere with the desired action of the governor-balls.

What I claim as my invention is—

1. A combined power-transmitting and self-regulating device comprising a suitably-mounted shaft, a supporting member mounted to swing about said shaft as an axis, a spindle carried by said member, a friction-pulley on said spindle, gearing between said spindle and shaft, and means including governor-balls carried by the spindle for automatically causing lateral movement of the latter upon an increase of speed.

2. A combined power-transmitting and speed-governing device comprising a member to be driven, a friction-pulley, a speed-up connection between the pulley and the member to be driven, and means including a centrifugal device for causing movement of said pulley in a direction at right angles to its axis upon an increase of speed.

3. A combined power-transmitting and speed-regulating device comprising a rotary shaft, a movable support, a spindle mounted for rotation in said movable support, and a friction-pulley secured to said spindle, a speed-up connection between the spindle and the shaft, and centrifugally-operated means for automatically causing a lateral shift of said spindle upon an increase of speed.

4. A combined power-transmitting and speed-governing device comprising a U-frame with trunnions, bearings for said trunnions, a shaft extending through and axially alined with said trunnions, a spindle mounted in the swinging end portion of said U-frame, a friction-pulley secured to the spindle, a speed-up connection between the spindle and shaft, governor-balls carried by the spindle, a stationary portion, and suitable connection between the governor-balls and the said stationary portion whereby the spindle is automatically shifted laterally upon an increase of speed.

5. A combined power-transmitting and speed-governing device comprising a U-frame provided with trunnions, bearings in which said trunnions are supported for oscillation, a shaft supported for rotation in one of said trunnions, a spindle mounted for rotation in the freely-swinging end portion of the U-frame, a friction-pulley secured to the spindle at a point outside of the U-frame, a pinion secured to the shaft at a point inside of the U-frame, a gear-wheel secured to the spindle at a point inside the U-frame and engaging said pinion, a stationary portion, governor-balls carried by the spindle, and suitable connection between the governor-balls and said stationary portion whereby the spindle is automatically shifted laterally upon an increase of speed.

6. The combination of a fly-wheel, a stationary or rigidly-mounted machine to be operated, and a combined power-transmitting and speed-governing device intermediate of such fly-wheel and machine; said combined power-transmitting and speed-governing device comprising a friction-pulley adapted to engage said fly-wheel, and comprising also centrifugally-operated means whereby said pulley automatically shifts more or less out of contact with said fly-wheel upon an increase of speed.

Signed by me this 15th day of June, 1904.

BURLEIGH E. TRITT.

Witnesses:
C. J. ASH,
CHARLES M. KRIEGHBAUM.